US012754093B2

(12) United States Patent
Zhang et al.

(10) Patent No.: US 12,754,093 B2
(45) Date of Patent: Oct. 6, 2026

(54) PACKING FAILURE DETECTION IN A PUMP OF A HYDRAULIC FRACTURING RIG

(71) Applicant: Caterpillar Inc., Peoria, IL (US)

(72) Inventors: Yanchai Zhang, Dunlap, IL (US); Zhaoxu Dong, Dunlap, IL (US); Xuefei Hu, Dunlap, IL (US); Daryl James Belshan, Weatherford, TX (US)

(73) Assignee: Caterpillar Inc., Peoria, IL (US)

( * ) Notice: Subject to any disclaimer, the term of this patent is extended or adjusted under 35 U.S.C. 154(b) by 738 days.

(21) Appl. No.: 18/161,522

(22) Filed: Jan. 30, 2023

(65) Prior Publication Data

US 2024/0255373 A1 Aug. 1, 2024

(51) Int. Cl.

| | |
|---|---|
| ***G01M 3/02*** | (2006.01) |
| ***E21B 43/26*** | (2006.01) |
| ***G01M 13/00*** | (2019.01) |

(52) U.S. Cl.

CPC .......... *G01M 3/02* (2013.01); *E21B 43/2607* (2020.05); *G01M 13/00* (2013.01)

(58) Field of Classification Search

None

See application file for complete search history.

(56) References Cited

U.S. PATENT DOCUMENTS

| | | | | |
|---|---|---|---|---|
| 8,919,439 | B2 | 12/2014 | Grigsby et al. | |
| 10,317,875 | B2 | 6/2019 | Pandurangan et al. | |
| 11,022,526 | B1 | 6/2021 | Yeung et al. | |
| 2020/0003205 | A1 | 1/2020 | Stokkevag et al. | |
| 2020/0063548 | A1 * | 2/2020 | Cai | F16K 37/0083 |
| 2020/0370988 | A1 | 11/2020 | Rogers et al. | |
| 2021/0025383 | A1 * | 1/2021 | Bodishbaugh | F04B 15/02 |
| 2021/0199110 | A1 * | 7/2021 | Albert | G05B 23/0283 |

FOREIGN PATENT DOCUMENTS

| | | | |
|---|---|---|---|
| WO | 2022093676 | A1 | 5/2022 |

* cited by examiner

*Primary Examiner* — Matthew G Marini

(57) ABSTRACT

A system obtains sensor data that includes: first vibration data related to vibration of an inlet manifold of a pump of a hydraulic fracturing rig, pump speed data related to a speed of the pump, pressure data related to a pressure of an outlet manifold of the pump, second vibration data related to vibration of a packing of the pump, and leakage data related to a leakage of fracturing fluid by the packing. The system processes the first vibration data and the pump speed data to determine that an inlet valve of the pump and an outlet valve of the pump have not failed, and thereby processes the pressure data to determine that the packing of the pump has failed. The system determines, based on at least one of the second vibration data and the leakage data, a failure severity level associated with the packing of the pump.

20 Claims, 5 Drawing Sheets

PACKING FAILURE DETECTION IN A PUMP OF A HYDRAULIC FRACTURING RIG

TECHNICAL FIELD

The present disclosure relates generally to a rig monitoring system and, for example, to a rig monitoring system for detecting failure of a packing of a pump of a hydraulic fracturing rig.

BACKGROUND

Hydraulic fracturing is a means for extracting oil and gas from rock, typically to supplement a horizontal drilling operation. In particular, high-pressure fluid (referred to as a fracturing fluid) is used to fracture the rock, stimulating a flow of oil and gas through the rock to increase the volumes of oil or gas that can be recovered. A hydraulic fracturing rig that includes, among other components, an engine, a transmission, and a pump, is typically used to inject the high-pressure fluid into a wellhead associated with an extraction site. During use of the hydraulic fracturing rig, a packing associated with the pump of the hydraulic fracturing rig may experience wear and tear (e.g., normal and/or abnormal wear and tear), which may ultimately cause the packing to fail (e.g., cause hydraulic fluid to leak from the pump via the packing). This results in a decrease in flow from the pump, which reduces the pump efficiency. Consequently, the hydraulic fracturing rig may consume additional fuel resources to cause the pump to compensate for the decrease in flow of the high-pressure fluid, which increases emissions levels associated with operating the hydraulic fracturing rig and/or the pump. Additionally, continued use of the pump after the packing has failed can result in damage to one or more components of the pump, such as a reciprocating member of the pump. Further, an unexpected failure of the packing results in downtime for the hydraulic fracturing rig to replace the packing.

U.S. Patent Application Publication No. 2020/0003205 (the '205 publication) discloses a hydraulically-driven assembly configured to apply variable amounts of pressure on a packing of a cylinder of a fracturing pump. While the '205 publication discloses fracturing pump systems that may have extended packing lifespans, since the packing is not subjected to excessive forces or over pressured, which result in premature wear or failure, the '205 publication does not disclose detecting when a packing of a pump of a hydraulic fracturing rig has failed, determining a severity level of the failure, or providing information that can be used to address the failure.

Accordingly, the rig monitoring system of the present disclosure solves one or more of the problems set forth above and/or other problems in the art.

SUMMARY

In some implementations, a method includes obtaining, by a system and from a set of sensors, sensor data that includes: first vibration data related to vibration of an inlet manifold of a pump of a hydraulic fracturing rig during operation of the pump, pump speed data related to a speed of the pump during operation of the pump, pressure data related to a pressure of an outlet manifold of the pump during operation of the pump, second vibration data related to vibration of a packing of the pump during operation of the pump, and leakage data related to a leakage of fracturing fluid by the packing of the pump during operation of the pump; processing, by the system, the first vibration data and the pump speed data to determine that an inlet valve associated with the inlet manifold of the pump and an outlet valve associated with the outlet manifold of the pump have not failed; processing, by the system and based on determining that the inlet valve and the outlet valve have not failed, the pressure data to determine that the packing of the pump has failed; determining, based on at least one of the second vibration data and the leakage data, a failure severity level associated with the packing of the pump; and providing, by the system, information indicating that the packing of the pump has failed and the failure severity level associated with the packing of the pump.

In some implementations, a system includes one or more memories; and one or more processors, coupled to the one or more memories, configured to: obtain, from a set of sensors, sensor data that includes: first vibration data related to vibration of an inlet manifold of a pump of a hydraulic fracturing rig during operation of the pump, and pressure data related to a pressure of an outlet manifold of the pump during operation of the pump, process the first vibration data to determine that an inlet valve associated with the inlet manifold of the pump and an outlet valve associated with the outlet manifold of the pump have not failed; process, based on determining that the inlet valve and the outlet valve have not failed, the pressure data to determine whether a packing of the pump has failed; and provide information indicating whether the packing of the pump has failed.

In some implementations, a non-transitory computer-readable medium storing a set of instructions includes one or more instructions that, when executed by one or more processors of a system, cause the system to: obtain, from a set of sensors, sensor data that includes: first vibration data related to vibration of an inlet manifold of a pump of a hydraulic fracturing rig during operation of the pump, and pressure data related to a pressure of an outlet manifold of the pump during operation of the pump, process the first vibration data and the pressure data to determine whether a packing of the pump has failed; and provide information indicating whether the packing of the pump has failed.

DETAILED DESCRIPTION

This disclosure relates to a rig management system. The rig management system has universal applicability to any machine utilizing such a rig management system. The term "machine" may refer to any machine that performs an operation associated with an industry such as, for example, hydraulic fracturing. The machine may be, for example, a hydraulic fracturing rig (e.g., a trailer-mounted hydraulic fracturing rig).

Figure 1:
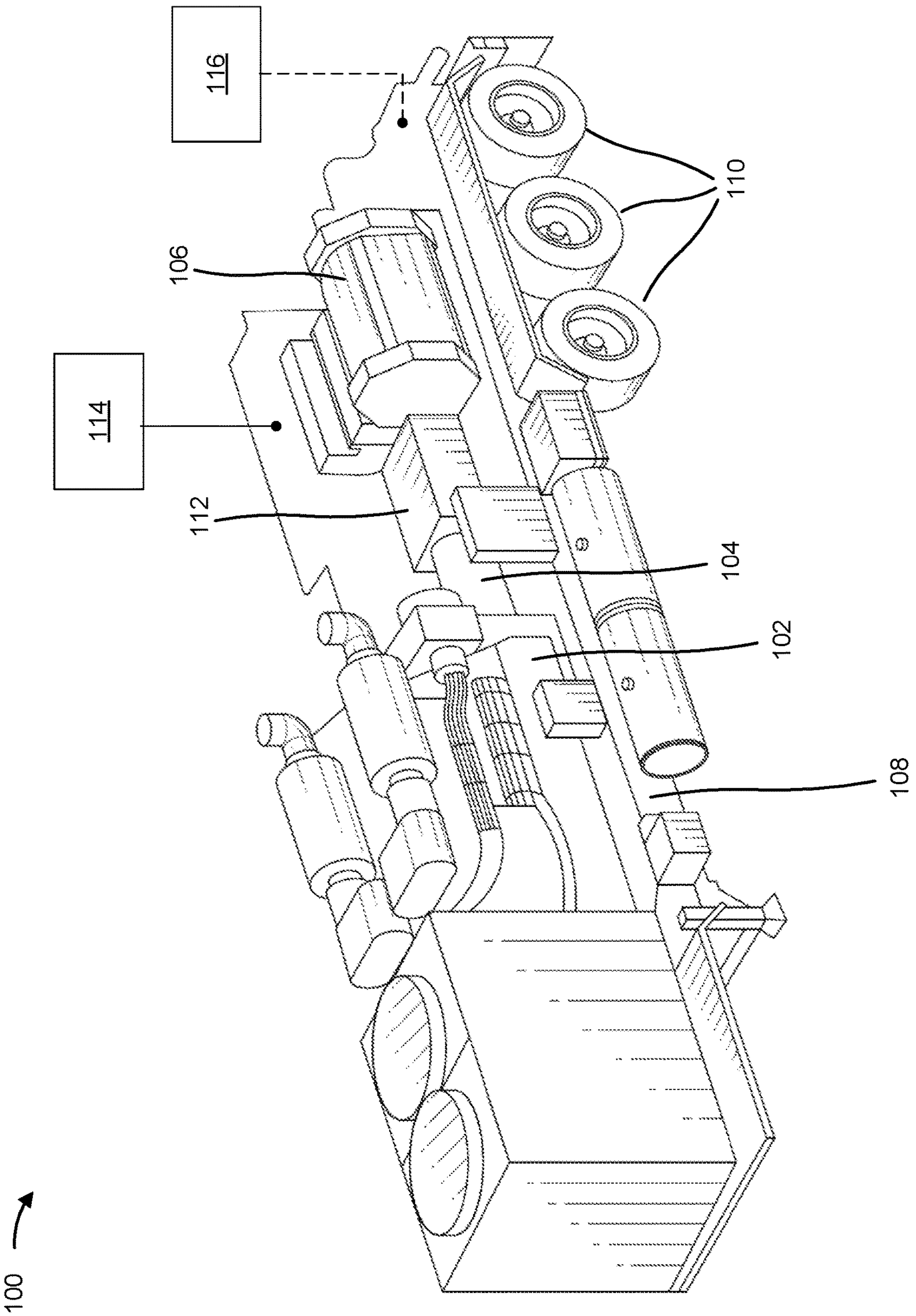
FIG. 1 is a diagram illustrating an example hydraulic fracturing rig.

FIG. 1 is a diagram illustrating an example hydraulic fracturing rig 100. The hydraulic fracturing rig 100 may include an engine 102 (e.g., a gasoline powered engine or a diesel engine), a transmission 104 that is operatively connected to and driven by the engine 102, and a pump 106 (e.g., a hydraulic pump) that is operatively connected to and driven by the transmission 104. The pump 106 may be configured to pump fluid (e.g., hydraulic fluid or fracturing fluid) into the ground to fracture rock layers during a fracturing process performed by the hydraulic fracturing rig 100. Because the fracturing process may require introduction of fluids at different locations about an extraction site, the hydraulic fracturing rig 100 may be supported by a mobile trailer 108 disposed on wheels 110 to enable transportation of the hydraulic fracturing rig 100 about the extraction site.

The transmission 104 may be configured with a plurality of gears operative between the engine 102 and an output shaft (not shown) of the transmission 104 to alter a rotational speed of an output of the engine 102. In some implementations, a gear mechanism 112 (e.g., a fixed gear mechanism) may be provided between the output shaft of the transmission 104 and a drive shaft (e.g., the drive shaft 206 shown in FIG. 2) of the pump 106 to transfer torque from the engine 102 to the pump 106.

As further shown in FIG. 1, the hydraulic fracturing rig 100 may include a set of sensors 114. The set of sensors 114 may be installed at one or more points on the hydraulic fracturing rig 100 and may be configured to generate sensor data, as described herein. For example, the set of sensors may include one or more sensors to, during operation of the pump 106, detect vibrations associated with components of the pump 106, determine a speed of the pump 106, and/or detect leakage of fluid (e.g., fracturing fluid) from the pump 106, among other examples.

The hydraulic fracturing rig 100 may be associated with a rig monitoring system 116. The rig monitoring system 116 may be in communication (e.g., by a wired connection or a wireless connection) with the fracturing rig 100. The rig monitoring system 116 may also be in communication with other equipment and/or systems of the fracturing rig 100. The rig monitoring system 116 may include a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor may be implemented in hardware, firmware, and/or a combination of hardware and software. The rig monitoring system 116 may include one or more processors capable of being programmed to perform a function. One or more memories, including a random-access memory (RAM), a read only memory (ROM), and/or another type of dynamic or static storage device (e.g., a flash memory, a magnetic memory, and/or an optical memory) may store information and/or instructions for use by the rig monitoring system 116. The rig monitoring system 116 may include a memory (e.g., a non-transitory computer-readable medium) capable of storing instructions, that when executed, cause the processor to perform one or more processes and/or methods described herein.

As indicated above, FIG. 1 is provided as an example. Other examples may differ from what is described with regard to FIG. 1.

Figure 2:
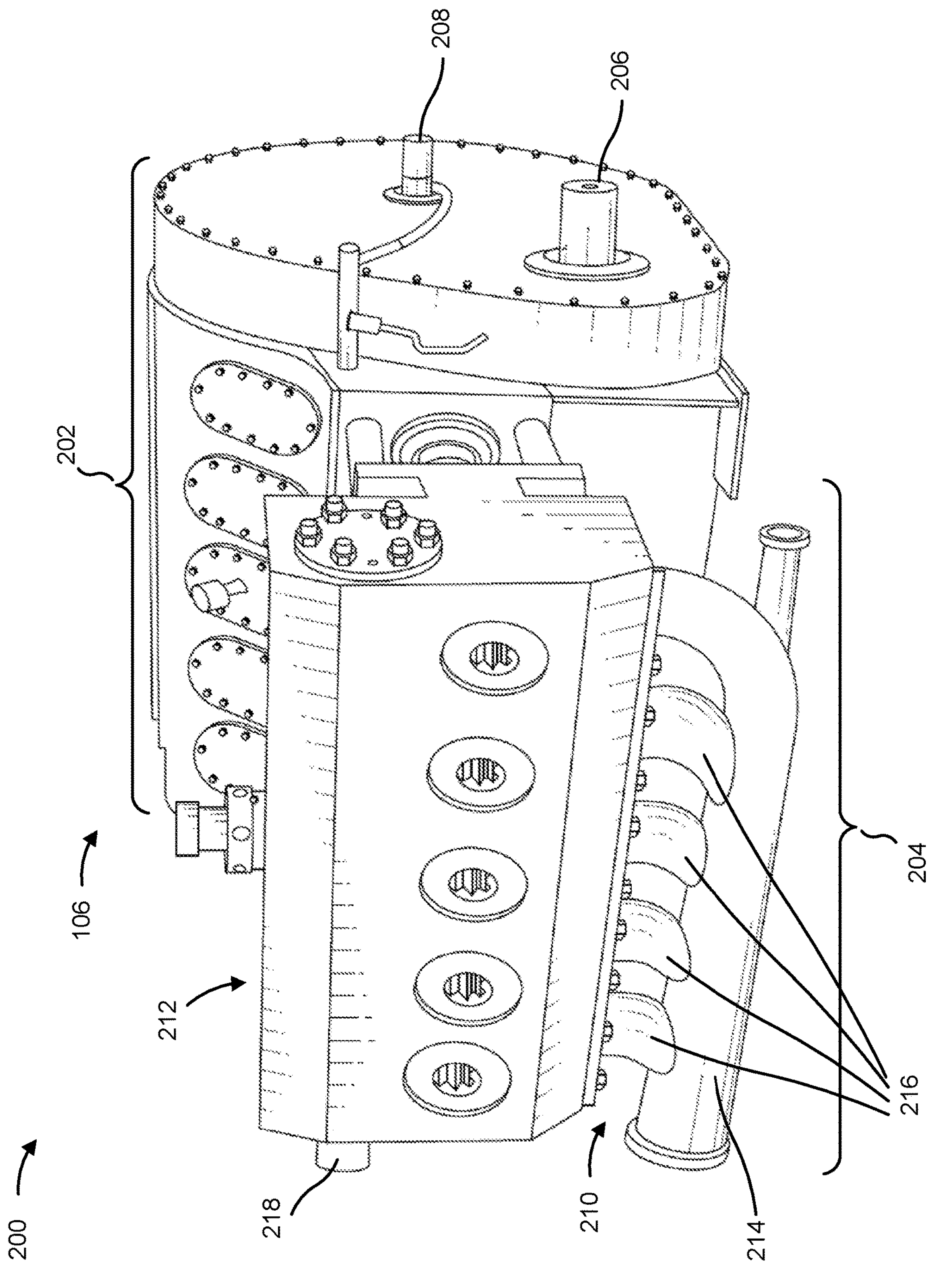
FIG. 2 is a diagram illustrating an example pump of the hydraulic fracturing rig.

FIG. 2 is a diagram 200 illustrating an example pump 106 of the hydraulic fracturing rig 100 described herein. As shown in FIG. 2, the pump 106 may include a power section 202 and a fluid section 204. The power section 202 may include a drive shaft 206 operatively connected to and driven by the transmission 104. The drive shaft 206 may be operatively connected to an additional shaft 208 (e.g., through gears or other structures or mechanisms, not shown) to convert rotational movement of the drive shaft 206 into a linear movement at the fluid section 204 of the pump 106.

Figure 3:
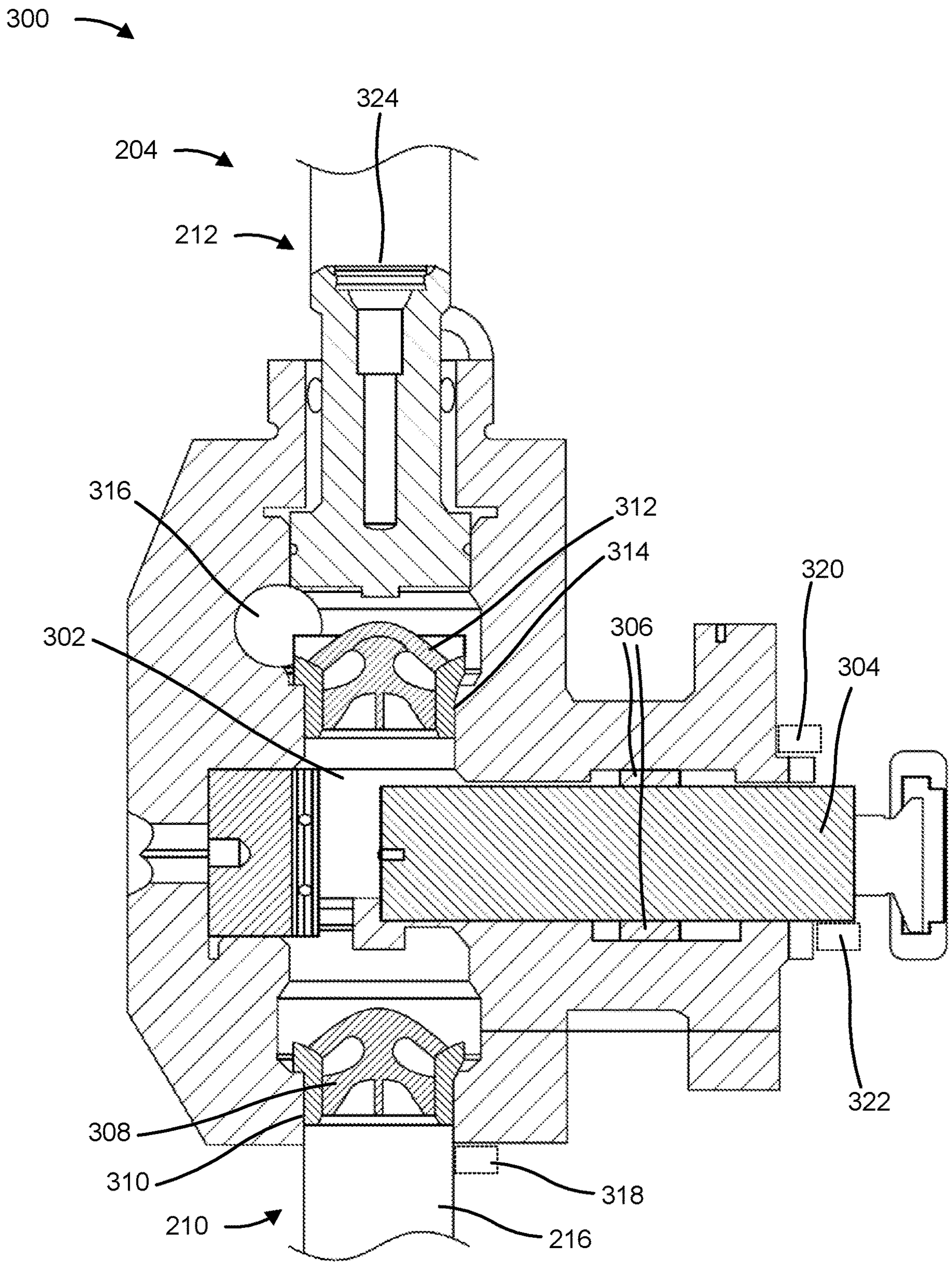
FIG. 3 is a diagram illustrating a sectional view of an example portion of a fluid section of the pump.

The fluid section 204 may include an inlet end 210 and an outlet end 212, spaced from the inlet end 210, with one or more cylinders (e.g., one or more cylinders 302, such as shown in FIG. 3) disposed between the inlet end 210 and the outlet end 212. An inlet conduit (not shown) may be fluidly connected to an inlet manifold 214 positioned at the inlet end 210. The inlet manifold 214 may include one or more inlet lines 216 respectively connected (e.g., fluidly connected) to the one or more cylinders. An outlet conduit (not shown) may be fluidly connected to an outlet manifold 218 positioned at the outlet end 212. The outlet manifold 218 fluidly connects one or more cylinders (e.g., such as after the outlet valve 312 shown in FIG. 3).

As indicated above, FIG. 2 is provided as an example. Other examples may differ from what is described with regard to FIG. 2.

FIG. 3 is a diagram 300 illustrating a sectional view of an example portion of the fluid section 204 of the pump 106 described herein. As shown in FIG. 3, a cylinder 302, of the one or more cylinders 302, may include a reciprocating member 304, such as a piston, that is configured to perform a reciprocating sliding movement within the cylinder 302. A packing 306 may be included in the cylinder 302 and may surround (e.g., circumferentially surround) the reciprocating member 304. The packing 306 may comprise a polymer, a metal, and/or one or more other materials, and may be configured to prevent leakage of fluid (e.g., fracturing fluid) from the cylinder 302 during operation of the pump 106.

The inlet end 210 may include one or more inlet valves 308 (also referred to as suction valves). Each inlet valve 308 may be positioned along an inlet wall 310 between each inlet line 216 and an associated cylinder 302. In some implementations, the inlet valve 308 may be biased in a closed condition or position, and moved to an open position to permit fluid (e.g., fracturing fluid) to pass therethrough to the cylinder 302 (e.g., by a positive pressure applied to the fluid, such as by another object outside the scope of this disclosure).

The outlet end 212 may include one or more outlet valves 312 (also referred to as discharge valves). Each outlet valve 312 may be positioned along an outlet wall 314 between each outlet line 316 and an associated cylinder 302. In some implementations, the outlet valve 312 may be biased in a closed condition or position and moved to an open position to permit fluid (e.g., fracturing fluid) to pass therethrough from the cylinder 302 (e.g., by a positive pressure generated by movement of the reciprocating member 304).

During a pumping process, operation of the engine 102 may drive rotation of the transmission 104 and ultimately rotation of the drive shaft 206 of the pump 106. Rotation of the drive shaft 206 causes reciprocating movement of respective reciprocating members 304 within the one or more cylinders 302. The reciprocating movement of the reciprocating members 304 may allow fluid (e.g., fracking fluid) to enter through the inlet manifold 214 from the inlet conduit (not shown) and into the one or more cylinders 302 through the one or more inlet lines 216 and past the one or more inlet valves 308. The fluid may be driven by the reciprocating members 304 past the one or more outlet valves 312 through the one or more outlet lines 316 and into outlet manifold 218.

FIG. 3 additionally shows one or more locations for at least some of the set of sensors 114. In some implementations, the set of sensors 114 may include at least one first vibration sensor, which may be installed in association with the inlet manifold 214, such as at the location 318 shown in FIG. 3 (e.g., proximate to the one or more inlet lines 216 and/or the one or more inlet valves 308). The at least one first vibration sensor may be configured to detect and/or to determine vibration of the inlet manifold 214 (e.g., during operation of the pump 106). The set of sensors 114 may include at least one second vibration sensor, which may be installed in association with the packing 306, such as at the location 320 shown in FIG. 3 (e.g., proximate to the packing 306 and/or the reciprocating member 304). The at least one second vibration sensor may be configured to detect and/or to determine vibration of the packing 306 (e.g., during operation of the pump 106). The set of sensors 114 may include a pump speed sensor, which may be installed on the pump 106 (not shown in FIG. 3), and may be configured to determine a speed of the pump 106. The set of sensors 114 may include at least one leakage sensor, which may be installed in association with the packing 306, such as at the location 322 shown in FIG. 3 (e.g., proximate to the packing 306 and/or the reciprocating member 304 such that any leakage of fluid via the packing 306 flows to the at least one leakage sensor). The at least one leakage sensor may detect and/or determine the leakage of the fluid by the packing 306 (e.g., during operation of the pump 106). The set of sensors 114 may include at least one pressure sensor, which may be installed at the location 324 shown in FIG. 3. The at least one pressure sensor may detect and/or determine a pressure of the outlet manifold 218 (e.g., during operation of the pump 106).

As indicated above, FIG. 3 is provided as an example. Other examples may differ from what is described with regard to FIG. 3.

Figure 4:
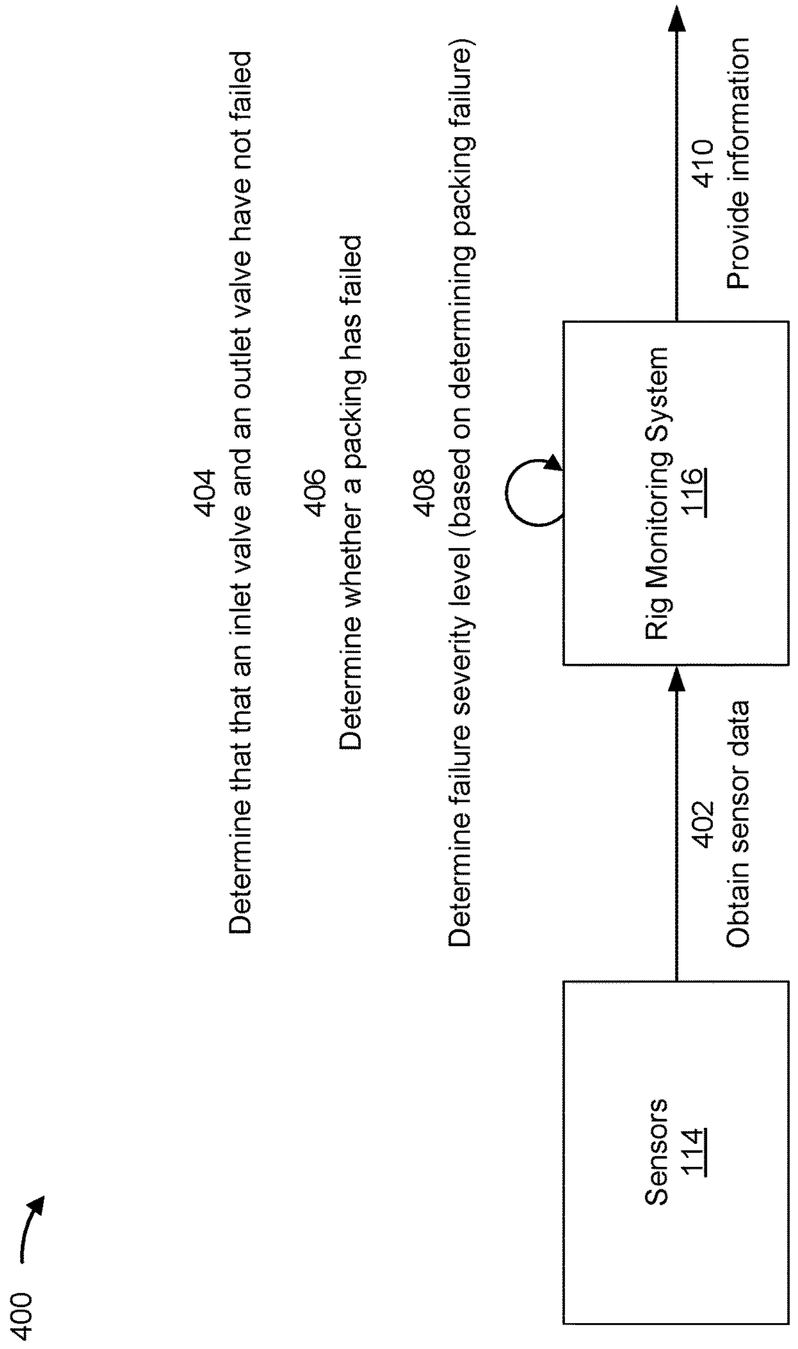
FIG. 4 is a diagram of an example of determining whether a packing has failed.

FIG. 4 is a diagram 400 of an example of determining whether the packing 306 of the pump 106 has failed. As shown in FIG. 4, and by reference number 402, the rig monitoring system 116 may obtain sensor data, such as from the set of sensors 114. The sensor data may include, for example, first vibration data related to vibration of the inlet manifold 214 during operation of the pump 106 (e.g., that was generated by the at least one first vibration sensor of the set of sensors 114) and/or second vibration data related to vibration of the packing 306 during operation of the pump 106 (e.g., that was generated by the at least one second vibration sensor of the set of sensors 114). The first vibration data and the second vibration data may each be in units of gravity (g), may indicate a force of a vibration (e.g., of the inlet manifold 214 or the packing 306), and/or may indicate a pattern of the vibration. Additionally, or alternatively, the first vibration data and the second vibration data may each be time-series data (e.g., may identify a vibration over time).

Additionally, or alternatively, the sensor data may include pump speed data related to a speed of the pump 106 during operation of the pump 106 (e.g., that was generated by the pump speed sensor of the set of sensors 114). The pump speed data may identify a volume of fluid (e.g., fracturing fluid) per unit of time being pumped by the pump 106, a flow rate of the pump 106, a rotational speed of the pump 106 (or one or more components of the pump 106), a suction speed of the pump 106, and/or a discharge speed of the pump 106. In some implementations, the pump speed data may be in units of pump specific speed ($N_s$) and/or net suction specific speed ($N_{ss}$), and may be time-series data. The sensor data may include pressure data related to a pressure of the outlet manifold 218 during operation of the pump 106 (e.g., that was generated by the at least one pressure sensor of the set of sensors 114). The pressure data may identify a discharge pressure of the fluid (e.g., a pressure of the fluid in the outlet manifold 218 and/or as the fluid exits the outlet manifold 218). The pressure data may be in units of pounds per square inch (psi) and/or kilopascals (kPa), and may be time-series data. The sensor data may include leakage data related to a leakage of the fluid by the packing 306 during operation of the pump 106 (e.g., that was generated by the at least one leakage sensor of the set of sensors 114). The leakage data may identify whether leaked fluid is present and/or a volume of the leaked fluid. The leakage data may be a binary indication (e.g., yes or no as to whether leaked fluid is present) or may be in units of milliliters (mL) and/or liters (L), and may be time-series data.

As shown by reference number 404, the rig monitoring system 116 may determine that an inlet valve 308, of the one or more inlet valves 308, of the pump 106 and an outlet valve 312, of the one or more outlet valves 312, have not failed. The rig monitoring system 116 may process the first vibration data to determine that the inlet valve 308 and the outlet valve 312 have not failed. For example, the rig monitoring system 116 may determine, based on the first vibration data, whether a vibration condition is satisfied (e.g., whether the vibration of the inlet manifold 214 is less than or equal to an expected vibration of the inlet manifold 214). When the rig monitoring system 116 determines that the vibration condition is satisfied, the rig monitoring system 116 determines that inlet valve 308 and the outlet valve 312 have not failed.

In another example, the rig monitoring system 116 may identify (e.g., based on configuration information and/or a pump operation model included in a data structure of the rig monitoring system 116) an expected vibration pattern associated with the vibration of the inlet manifold 214 of the pump 106, and may process the first vibration data to identify a detected vibration pattern associated with the vibration of the inlet manifold 214. The rig monitoring system 116 may determine, based on the expected vibration pattern and the detected vibration pattern, a vibration difference score. The vibration difference score may indicate, for example, how different the detected vibration pattern is than the expected vibration pattern (e.g., based on whether higher or lower extrema values are present in the detected vibration pattern than expected and/or whether the detected vibration pattern is non-uniform, among other examples). The rig monitoring system 116 then may determine whether the vibration difference score satisfies (e.g., is greater than or equal to) a vibration difference score threshold (e.g., where vibration difference scores that are greater than or equal to the vibration difference score threshold are indicative of a failure of the inlet valve 308). Accordingly, the rig monitoring system 116 may determine that the vibration difference score does not satisfy the vibration difference score threshold, and may thereby determine that the inlet valve 308 and the outlet valve 312 have not failed. The rig monitoring system 116 may therefore perform one or more of the additional processing steps described herein in relation to FIG. 4. Alternatively, the rig monitoring system 116 may perform one or more other steps to determine which of the inlet valve 308 or the outlet valve 312 has failed (e.g., as opposed to the packing 306).

In some implementations, the rig monitoring system 116 may process the first vibration data and the pump speed data to determine that inlet valve 308 and the outlet valve 312 have not failed. For example, the rig monitoring system 116 may normalize the first vibration data based on the pump speed data, such as by normalizing the first vibration data to a particular pump speed of the pump 106 (e.g., an average pump speed of the pump 106) indicated by the pump speed data. This may facilitate a more accurate analysis of the first vibration data (e.g., via use of a consistent pump speed). Accordingly, the rig monitoring system 116 may process the normalized first vibration data to determine that the inlet valve 308 and the outlet valve 312 have not failed (e.g., in a similar manner as that disclosed elsewhere herein). In some implementations, the rig monitoring system 116 may determine, based on the normalized first vibration data, statistical vibration information, which may include a peak value associated with the normalized first vibration data, a peak-to-peak value associated with the normalized first vibration data, a root mean square value associated with the normalized first vibration data, and/or other statistical information associated with the normalized first vibration data. The rig monitoring system 116 may therefore determine, based on the statistical vibration information, that the inlet valve 308 and the outlet valve 312 have not failed (e.g., in a similar manner as that disclosed elsewhere herein).

As another example, the pump speed data may also include crank angle information associated with the one or more cylinders 302 and/or timing information that indicates a firing order of the one or more cylinders 302. Accordingly, the rig monitoring system 116 may process the first vibration data and the pump speed to identify detected vibration patterns associated with the vibration of the inlet manifold 214 that are respectively associated with firing periods and/or crank angles associated with the one or more cylinders 302. The rig monitoring system 116 may identify (e.g., based on configuration information and/or a pump operation model included in a data structure of the rig monitoring system 116) expected vibration patterns associated with the vibration of the inlet manifold 214 of the pump 106 that are respectively associated with firing periods and/or crank angles associated with the one or more cylinders 302. The rig monitoring system 116 may determine, based on the expected vibration patterns and the detected vibration patterns, vibration difference scores. Each vibration difference score may indicate, for example, how different a detected vibration pattern is than a corresponding expected vibration pattern (e.g., based on whether higher or lower extrema values are present in the detected vibration pattern than expected and/or whether the detected vibration pattern is non-uniform, among other examples). The rig monitoring system 116 then may determine whether at least one vibration difference score, of the vibration difference scores, satisfies (e.g., is greater than or equal to) a vibration difference score threshold (e.g., where vibration difference scores that are greater than or equal to the vibration difference score threshold are indicative of a failure of the inlet valve 308 and the outlet valve 312). Accordingly, the rig monitoring system 116 may determine that no vibration difference score satisfies the vibration difference score threshold, and may thereby determine that the inlet valve 308 and the outlet valve 312 have not failed. The rig monitoring system 116 may therefore perform one or more of the additional processing steps described herein in relation to FIG. 4. Alternatively, the rig monitoring system 116 may perform one or more other steps to determine which of the inlet valve 308 or the outlet valve 312 has failed (e.g., as opposed to the packing 306).

As shown by reference number 406, the rig monitoring system 116 may determine whether the packing 306 of the pump 106 has failed. The rig monitoring system 116 may process the pressure data to determine whether the packing 306 has failed. For example, the rig monitoring system 116 may determine, based on the pressure data, whether a pressure condition is satisfied (e.g., whether the pressure of the outlet manifold 218 is greater than or equal to an expected pressure of the outlet manifold 218). When the rig monitoring system 116 determines that the pressure condition is satisfied, the rig monitoring system 116 determines that the packing 306 has failed. Alternatively, when the rig monitoring system 116 determines that the pressure condition is not satisfied, the rig monitoring system 116 determines that the packing 306 has not failed.

In another example, the rig monitoring system 116 may identify (e.g., based on configuration information and/or a pump operation model included in a data structure of the rig monitoring system 116) an expected pressure pattern associated with the pressure of the outlet manifold 218 of the pump 106, and may process the pressure data to identify a detected pressure pattern associated with the pressure of the outlet manifold 218. The rig monitoring system 116 may determine, based on the expected pressure pattern and the detected pressure pattern, a pressure difference score. The pressure difference score may indicate, for example, how different the detected pressure pattern is than the expected pressure pattern (e.g., based on whether higher or lower extrema values are present in the detected pressure pattern and/or whether the detected pressure pattern is non-uniform, among other examples). The rig monitoring system 116 then may determine whether the pressure difference score satisfies (e.g., is greater than or equal to) a pressure difference score threshold (e.g., where pressure difference scores that are greater than or equal to the pressure difference score threshold are indicative of a failure of the packing 306). Accordingly, the rig monitoring system 116 may determine that the pressure difference score does not satisfy the pressure difference score threshold, and may thereby determine that the packing 306 has not failed. The rig monitoring system 116 may therefore not perform any additional processing steps described herein in relation to FIG. 4 (e.g., because no failure of the packing 306 has been detected). Alternatively, the rig monitoring system 116 may determine that the pressure difference score satisfies the pressure difference score threshold, and may thereby determine that the packing 306 has failed. Accordingly, the rig monitoring system 116 may perform one or more other steps described herein in relation to FIG. 4.

As shown by reference number 408, the rig monitoring system 116 may determine a failure severity level associated with the packing 306 of the pump 106 (e.g., based on determining that the packing 306 has failed). The failure severity level may be, for example, critical (e.g., the failure of the packing 306 is likely associated with a heavy leak that needs to be immediately addressed), or, alternatively, non-critical (e.g., the failure of the packing 306 is likely associated with a light leak that does not need to be immediately addressed).

The rig monitoring system 116 may process at least one of the second vibration data or the leakage data to determine the failure severity level. For example, the rig monitoring system 116 may determine, based on the second vibration data, whether a vibration condition is satisfied (e.g., whether the vibration of the packing 306 is greater than or equal to an expected vibration of the packing 306), and may determine, based on the leakage data, whether a leakage condition is satisfied (e.g., whether the leakage of fluid by the packing 306 is greater than or equal to an expected leakage by the packing 306). When the rig monitoring system 116 determines that at least one of the vibration condition or the leakage condition is satisfied, the rig monitoring system 116 determines that the failure security level is critical. Alternatively, when the rig monitoring system 116 determines that each of the vibration condition and the leakage condition are not satisfied (or that one particular condition is not satisfied), the rig monitoring system 116 determines that the failure security level is non-critical.

In another example, the rig monitoring system 116 may identify (e.g., based on configuration information and/or a pump operation model included in a data structure of the rig monitoring system 116) an expected vibration pattern associated with the vibration of the packing 306 of the pump 106, and may process the second vibration data to identify a detected vibration pattern associated with the vibration of the packing 306. The rig monitoring system 116 may determine, based on the expected vibration pattern and the detected vibration pattern, a vibration difference score. The vibration difference score may indicate, for example, how different the detected vibration pattern is than the expected vibration pattern (e.g., based on whether higher or lower extrema values are present in the detected vibration pattern and/or whether the detected vibration pattern is non-uniform, among other examples). The rig monitoring system 116 then may determine whether the vibration difference score satisfies (e.g., is greater than or equal to) a vibration difference score threshold (e.g., where vibration difference scores that are greater than or equal to the vibration difference score threshold are indicative of a critical failure security level). Accordingly, the rig monitoring system 116 may determine that the vibration difference score does not satisfy the vibration difference score threshold, and may thereby determine that the failure security level is non-critical. Alternatively, the rig monitoring system 116 may determine that the vibration difference score satisfies the vibration difference score threshold, and may thereby determine that the failure security level is critical.

In an additional example, the rig monitoring system 116 may process the leakage data to determine a detected leakage value associated with the leakage of fluid by the packing 306 of the pump 106. The rig monitoring system 116 may identify (e.g., based on configuration information and/or a pump operation model included in a data structure of the rig monitoring system 116) an expected leakage value threshold (e.g., where detected leakage values that are greater than or equal to the expected leakage value threshold are indicative of a critical failure security level). The rig monitoring system 116 then may determine whether the detected leakage value satisfies (e.g., is greater than or equal to) the expected leakage value threshold. Accordingly, the rig monitoring system 116 may determine that the detected leakage value does not satisfy the expected leakage value threshold, and may thereby determine that the failure security level is non-critical. Alternatively, the rig monitoring system 116 may determine that the detected leakage value satisfies the expected leakage value threshold, and may thereby determine that the failure security level is critical.

As shown by reference number 410, the rig monitoring system 116 may provide information (e.g., to the system and/or another system). The information may indicate, for example, that the packing 306 of the pump 106 has failed and/or the failure severity level associated with the packing 306 of the pump 106.

For example, the rig monitoring system 116 may provide, for display on a display screen of the rig monitoring system 116 and/or a display screen of the hydraulic fracturing rig 100, the information. The information may be displayed, for example, as an alert or notification on the display screen. When the information includes the failure severity level, the alert or notification may include a color, or other visual indicator, to indicate the failure severity level. For example, the alert or notification may appear as orange when the failure severity level is non-critical, and may appear as red when the failure severity level is critical.

As indicated above, FIG. 4 is provided as an example. Other examples may differ from what is described with regard to FIG. 4.

Figure 5:
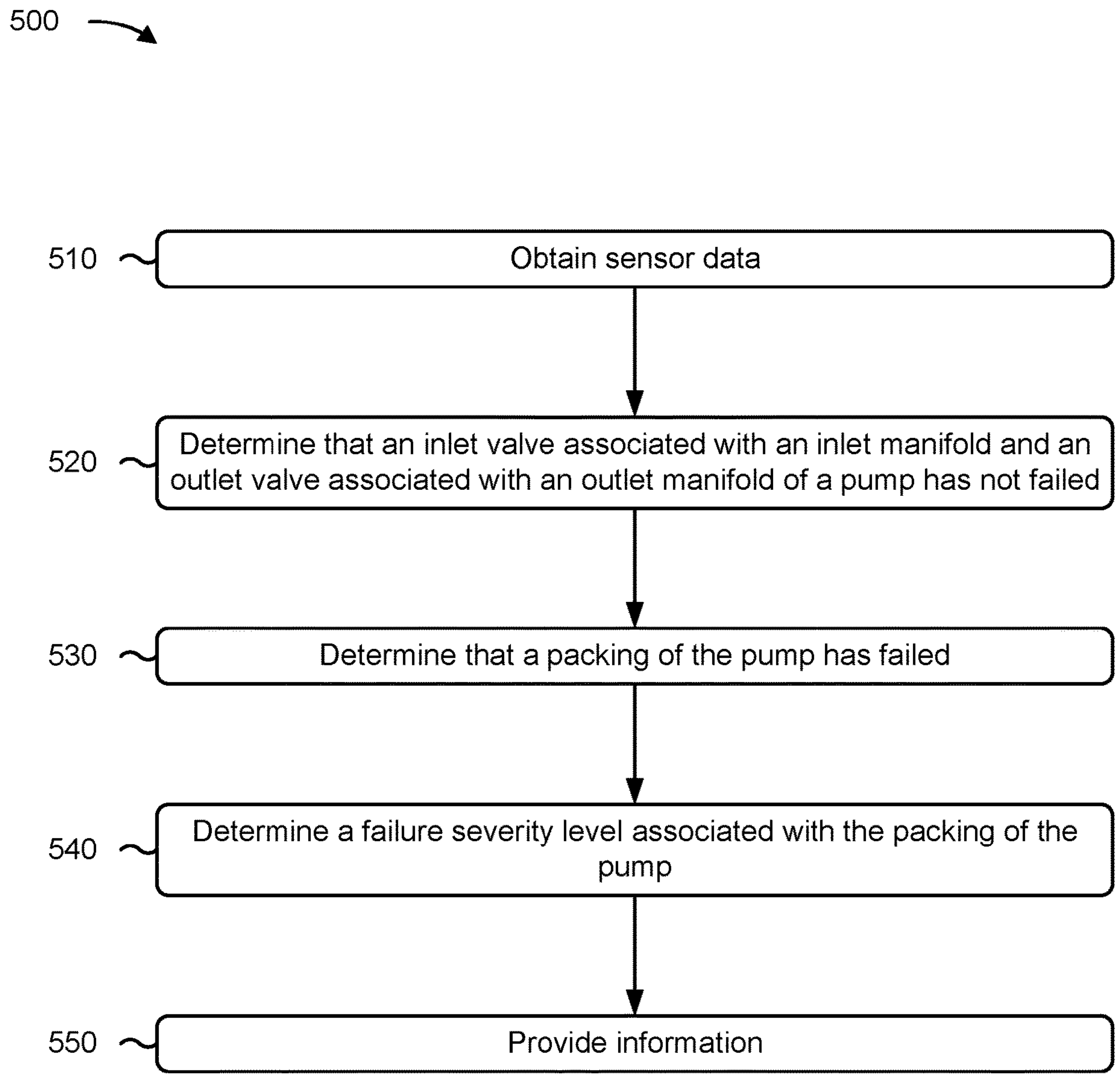
FIG. 5 is a flowchart of an example process 500 associated with packing failure detection in a pump of a hydraulic fracturing rig.

FIG. 5 is a flowchart of an example process 500 associated with packing failure detection in a pump of a hydraulic fracturing rig. In some implementations, one or more process blocks of FIG. 5 may be performed by a system (e.g., the rig monitoring system 116). In some implementations, one or more process blocks of FIG. 5 may be performed by another device or a group of devices separate from or including the system As shown in FIG. 5, process 500 may include obtaining sensor data (block 510). For example, the system may obtain sensor data (e.g., from a set of sensors), as described above. The sensor data may include first vibration data related to vibration of an inlet manifold of a pump of a hydraulic fracturing rig during operation of the pump, pump speed data related to a speed of the pump during operation of the pump, pressure data related to a pressure of an outlet manifold of the pump during operation of the pump, second vibration data related to vibration of a packing of the pump during operation of the pump, and leakage data related to a leakage of fracturing fluid by the packing of the pump during operation of the pump, as described above.

As further shown in FIG. 5, process 500 may include determining that an inlet valve associated with an inlet manifold and an outlet valve associated with an outlet manifold of a pump have not failed (block 520). For example, the system may process the first vibration data and/or the pump speed data to determine that an inlet valve associated with the inlet manifold and an outlet valve associated with an outlet manifold of a pump have not failed, as described above.

As further shown in FIG. 5, process 500 may include determining that a packing of the pump has failed (block 530). For example, the system may process, based on determining that the inlet valve and the outlet valve have not failed, the pressure data to determine that the packing of the pump has failed, as described above.

As further shown in FIG. 5, process 500 may include determining a failure severity level associated with the packing of the pump (block 540). For example, the system may determine, based on at least one of the second vibration data and the leakage data, a failure severity level associated with the packing of the pump, as described above.

As further shown in FIG. 5, process 500 may include providing information (block 550). For example, the system may provide information indicating that the packing of the pump has failed and the failure severity level associated with the packing of the pump, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

The above-described techniques allow a rig monitoring system 116 to detect when a packing 306 of a pump 106 of a hydraulic fracturing rig 100 has failed, determine a severity level of the failure, and provide information that can be used to address the failure. For example, the rig monitoring system 116 determines, based on first vibration data related to vibration of an inlet manifold 214 of a pump 106 of a hydraulic fracturing rig 100 during operation of the pump 106 and/or pump speed data related to a speed of the pump 106 during operation of the pump 106, that an inlet valve 308 associated with the inlet manifold 214 and an outlet valve 312 and an outlet manifold 218 of the pump have not failed. The rig monitoring system 116 thereby processes pressure data related to a pressure of the outlet manifold 218 of the pump 106 during operation of the pump 106 to determine that the packing 306 of the pump 106 has failed. Further, the rig monitoring system 116 determines, based on second vibration data related to vibration of the packing 306 of the pump 106 during operation of the pump 106 and/or leakage data related to a leakage of fracturing fluid by the packing 306 of the pump 106 during operation of the pump 106, a failure severity level associated with the packing 306 of the pump 106 (e.g., critical or non-critical). The rig monitoring system 116 then provides (e.g., for display to an operator of the rig monitoring system 116) information indicating that the packing 306 of the pump 106 has failed and/or the failure severity level associated with the packing 306 of the pump 106.

This allows the operator to quickly and/or efficiently identify a packing failure and/or a severity of the packing failure. The operator then can determine a preferred time to repair or replace the packing (e.g., immediately for a critical leak, or at a later time for a non-critical leak) and therefore minimize an amount of time that the hydraulic fracturing rig is down during a fracturing operation. Further, because the operator can timely schedule a time to repair or replace the packing, an amount of time that the pump is operating with a leaking packing is minimized, which reduces a likelihood that one or more other components of the pump, such as a reciprocating member of the pump, are damaged and therefore improves a performance and/or longevity of the pump and the one or more other components of the pump. Further, fewer additional fuel resources need to be consumed to compensate for a leaking packing.

What is claimed is:

1. A method, comprising:

obtaining, by a system, sensor data that includes:

first vibration data, related to vibration of an inlet manifold of a pump of a hydraulic fracturing rig during operation of the pump, generated by a first vibration sensor proximate to the inlet manifold, pump speed data related to a speed of the pump during operation of the pump, pressure data, related to a pressure of an outlet manifold of the pump during operation of the pump, generated from a pressure sensor at an outlet end of the pump, second vibration data, related to a vibration of a packing of the pump during operation of the pump, from a second vibration sensor proximate to the packing, and leakage data related to a leakage of fracturing fluid by the packing of the pump during operation of the pump;

determining, by the system and based on at least one of the first vibration data or the pump speed data, that an inlet valve associated with the inlet manifold of the pump and an outlet valve associated with the outlet manifold of the pump have not failed;

processing, by the system and based on determining that the inlet valve and the outlet valve have not failed, the pressure data;

determining, by the system and based on the pressure data, whether a pressure condition is satisfied;

determining, by the system and based on determining that the pressure condition is satisfied, that the packing of the pump has failed;

processing, by the system and based on determining that the packing of the pump has failed, at least one of the second vibration data or the leakage data;

determining, by the system and based on at least one of the second vibration data or the leakage data, a failure severity level associated with the packing of the pump; and providing, by the system, information indicating that the packing of the pump has failed and the failure severity level associated with the packing of the pump, the information and the failure severity level enabling determination of repair or replacement of the packing of the pump.

2. The method of claim 1, wherein determining that the inlet valve and the outlet valve have not failed comprises:

normalizing, based on the pump speed data, the first vibration data;

determining, based on the normalized first vibration data, statistical vibration information; and determining, based on the statistical vibration information, that the inlet valve and the outlet valve have not failed.

3. The method of claim 2, wherein the statistical vibration information comprises at least one of:

a peak value associated with the normalized first vibration data, a peak-to-peak value associated with the normalized first vibration data, or a root mean square value associated with the normalized first vibration data.

4. The method of claim 1, wherein determining that the packing of the pump has failed comprises:

identifying an expected pressure pattern associated with the pressure of the outlet manifold of the pump;

processing the pressure data to identify a detected pressure pattern associated with the pressure of the outlet manifold of the pump;

determining, based on the expected pressure pattern and the detected pressure pattern, a pressure difference score;

determining that the pressure difference score satisfies a pressure difference score threshold; and determining, based on determining that the pressure difference score satisfies the pressure difference score threshold, that the packing of the pump has failed.

5. The method of claim 1, wherein determining the failure severity level associated with the packing of the pump comprises:

identifying an expected vibration pattern associated with the vibration of the packing of the pump;

processing the second vibration data to identify a detected vibration pattern associated with the vibration of the packing of the pump;

determining, based on the expected vibration pattern and the detected vibration pattern, a vibration difference score; and determining, based on the vibration difference score, the failure severity level associated with the packing of the pump, wherein the failure severity level associated with the packing of the pump is critical or non-critical based on whether the vibration difference score satisfies a vibration difference score threshold.

6. The method of claim 1, wherein determining the failure severity level associated with the packing of the pump comprises:

processing the leakage data to determine a detected leakage value associated with the leakage of fracturing fluid by the packing of the pump; and determining, based on the detected leakage value, the failure severity level associated with the packing of the pump, wherein the failure severity level associated with the packing of the pump is critical or non-critical based on whether the detected leakage value satisfies an expected leakage value threshold.

7. The method of claim 1, wherein determining the failure severity level associated with the packing of the pump comprises:

determining, based on the second vibration data, whether a vibration condition is satisfied;

determining, based on the leakage data, whether a leakage condition is satisfied; and determining, based on determining whether the vibration condition is satisfied and determining whether the leakage condition is satisfied, the failure severity level associated with the packing of the pump, wherein the failure severity level associated with the packing of the pump is critical or non-critical based on whether at least one of the vibration condition or the leakage condition is satisfied.

8. The method of claim 1, wherein the information indicating that the packing of the pump has failed and the failure severity level associated with the packing of the pump is provided to another system.

9. The method of claim 1, wherein determining the inlet valve and the outlet valve have not failed comprises:

determining, based on the first vibration data, whether a vibration condition associated with the inlet manifold is satisfied; and determining, based on determining that the vibration condition is satisfied, the inlet valve and the outlet valve have not failed.

10. The method of claim 1, wherein determining that the inlet valve and the outlet valve have not failed comprises:

identifying, based on at least one of configuration information or a pump operational model, an expected vibration pattern associated with the vibration of the inlet manifold of the pump;

identifying, based on the first vibration data, a detected vibration pattern associated with the vibration of the inlet manifold;

determining, based on the expected vibration pattern and the detected vibration pattern, a vibration difference score; and determining, based on the vibration difference score, that the inlet valve and the outlet valve have not failed.

11. The method of claim 10, wherein the detected vibration pattern is associated with at least one of a firing period or a crank angle associated with one or more cylinders.

12. A system, comprising:

one or more memories; and one or more processors, coupled to the one or more memories, configured to:

obtain sensor data that includes:

first vibration data, related to vibration of an inlet manifold of a pump of a hydraulic fracturing rig during operation of the pump, generated by a first vibration sensor proximate to the inlet manifold, pump speed data related to a speed of the pump during operation of the pump, pressure data related to a pressure of an outlet manifold of the pump during operation of the pump, generated from a pressure sensor at an outlet end of the pump, second vibration data, related to a vibration of a packing of the pump during operation of the pump, from a second vibration sensor proximate to the packing, and leakage data related to a leakage of fracturing fluid by the packing of the pump during operation of the pump;

determine, based on at least one of the first vibration data or the pump speed data, that an inlet valve associated with the inlet manifold of the pump and an outlet valve associated with the outlet manifold of the pump have not failed;

process, based on determining that the inlet valve and the outlet valve have not failed, the pressure data;

determine, based on the pressure data, whether a pressure condition is satisfied;

determine, based on determining that the pressure condition is satisfied, that the packing of the pump has failed;

process, based on determining that the packing of the pump has failed, at least one of the second vibration data or the leakage data;

determine, based on at least one of the second vibration data or the leakage data, a failure severity level associated with the packing of the pump; and provide information indicating whether the packing of the pump has failed and the failure severity level associated with the packing of the pump, the information and the failure severity level enabling determination of repair or replacement of the packing of the pump.

13. The system of claim 12, wherein the one or more processors, to determine that the inlet valve and the outlet valve have not failed, are configured to:

identify an expected vibration pattern associated with the vibration of the inlet manifold of the pump;

process the first vibration data to identify a detected vibration pattern associated with the vibration of the inlet manifold of the pump;

determine, based on the expected vibration pattern and the detected vibration pattern, a vibration difference score;

determine that the vibration difference score does not satisfy a vibration difference score threshold; and determine, based on determining that the vibration difference score does not satisfy the vibration difference score threshold, that the inlet valve and the outlet valve have not failed.

14. The system of claim 12, wherein the one or more processors, to determine whether the packing of the pump has failed, are configured to:

identify an expected pressure pattern associated with the pressure of the outlet manifold of the pump;

process the pressure data to identify a detected pressure pattern associated with the pressure of the outlet manifold of the pump;

determine, based on the expected pressure pattern and the detected pressure pattern, a pressure difference score; and determine, based on whether the pressure difference score satisfies a pressure difference score threshold, whether the packing of the pump has failed.

15. The system of claim 12, wherein the one or more processors, to determine the failure severity level associated with the packing of the pump, are configured to:

identify an expected vibration pattern associated with the vibration of the packing of the pump;

process the second vibration data to identify a detected vibration pattern associated with the vibration of the packing of the pump;

determine, based on the expected vibration pattern and the detected vibration pattern, a vibration difference score; and determine, based on the vibration difference score, the failure severity level associated with the packing of the pump, wherein the failure severity level associated with the packing of the pump is critical or non-critical is based on whether the vibration difference score satisfies a vibration difference score threshold.

16. The system of claim 12, wherein the one or more processors, to determine the failure severity level associated with the packing of the pump, are configured to:

process the leakage data to determine a detected leakage value associated with the leakage of fracturing fluid by the packing of the pump; and determine, based on the detected leakage value, the failure severity level associated with the packing of the pump, wherein the failure severity level associated with the packing of the pump is critical or non-critical based on whether the detected leakage value satisfies an expected leakage value threshold.

17. A non-transitory computer-readable medium storing a set of instructions, the set of instructions comprising:

one or more instructions that, when executed by one or more processors of a system, cause the system to:

obtain sensor data that includes:

first vibration data, related to vibration of an inlet manifold of a pump of a hydraulic fracturing rig during operation of the pump, generated by a first vibration sensor proximate to the inlet manifold, pump speed data related to a speed of the pump during operation of the pump, pressure data related to a pressure of an outlet manifold of the pump during operation of the pump, generated from a pressure sensor at an outlet end of the pump, second vibration data, related to vibration of a packing of the pump during operation of the pump, from a second vibration sensor proximate to the packing, and leakage data related to a leakage of fracturing fluid by the packing of the pump during operation of the pump;

determine, based on at least one of the first vibration data or the pump speed data, that an inlet valve associated with the inlet manifold of the pump and an outlet valve associated with the outlet manifold of the pump have not failed;

process, based on determining that the inlet valve and the outlet valve have not failed, the pressure data;

determine, based on the pressure data, whether a pressure condition is satisfied;

determine, based on determining that the pressure condition is satisfied, whether the packing of the pump has failed;

determine, based on at least one of the second vibration data or the leakage data, a failure severity level associated with the packing of the pump; and provide information indicating that the packing of the pump has failed and the failure severity level associated with the packing of the pump, the information and the failure severity level enabling determination of repair or replacement of the packing of the pump.

18. The non-transitory computer-readable medium of claim 17, wherein the one or more instructions, that cause the system to determine whether the packing of the pump has failed, cause the system to:

determine, based on the first vibration data, whether a vibration condition is satisfied; and determine, based on determining whether the vibration condition is satisfied and determining whether the pressure condition is satisfied, whether the packing of the pump has failed, wherein whether the packing of the pump has failed is determined based on whether the vibration condition and the pressure condition are each satisfied.

19. The non-transitory computer-readable medium of claim 17, wherein the one or more instructions, that cause the system to determine the failure severity level associated with the packing of the pump, cause the system to:

determine, based on the second vibration data, whether a vibration condition is satisfied; and determine, based on determining whether the vibration condition is satisfied, the failure severity level associated with the packing of the pump, wherein the failure severity level associated with the packing of the pump is critical or non-critical based on whether the vibration condition is satisfied.

20. The non-transitory computer-readable medium of claim 17, wherein the one or more instructions, that cause the system to determine the failure severity level associated with the packing of the pump, cause the system to:

determine, based on the leakage data, whether a leakage condition is satisfied; and determine, based on determining whether the leakage condition is satisfied, the failure severity level associated with the packing of the pump, wherein the failure severity level associated with the packing of the pump is critical or non-critical based on whether the leakage condition is satisfied.

* * * * *